United States Patent [19]
Morris

[11] 3,791,429
[45] Feb. 12, 1974

[54] ROTARY CUTTER FOR WOODWORKING AND SIMILAR MACHINES

[75] Inventor: Philip Henry Morris, Evington, England

[73] Assignee: Wadkin Limited, Leicester, England

[22] Filed: June 7, 1971

[21] Appl. No.: 150,629

[30] Foreign Application Priority Data
June 9, 1970   Great Britain................... 27757/70

[52] U.S. Cl.............................. 144/218, 29/105 R
[51] Int. Cl.......................... B27g 13/00, B26d 1/12
[58] Field of Search......... 29/96, 105; 144/230, 218

[56] References Cited
UNITED STATES PATENTS
2,598,933   6/1952   Nevin................................. 144/230
3,028,657   10/1962  Almen................................... 29/96
1,032,636   7/1912   Watkins............................. 144/230
2,917,091   12/1959  Smith.................................. 144/230
1,039,054   9/1912   Hartzell............................. 144/230
895,219     8/1908   Whittemore...................... 144/230

Primary Examiner—Harrison L. Hinson

[57] ABSTRACT

A rotary cutter for woodworking and similar machines in which a single cutter blade or each of a plurality of circumferentially spaced cutter blades is of such thin construction that the "heel" formed on it by jointing (i.e., a rotary sharpening procedure) is kept within acceptable limits whilst extending across the full thickness of the blade, the blade being supported by a separate backing piece close to its cutting edge. Thereby the need for regrinding of a cutter blade to reduce the width of its heel is avoided.

7 Claims, 9 Drawing Figures

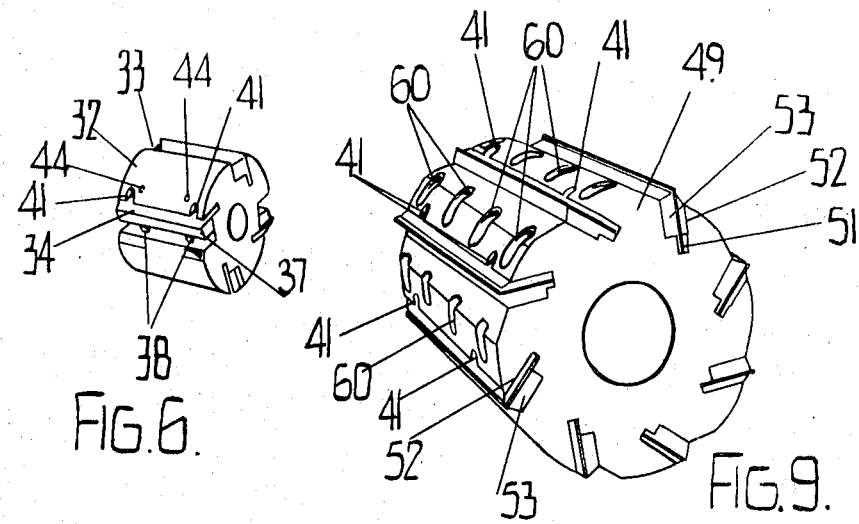
FIG.6.
FIG.9.
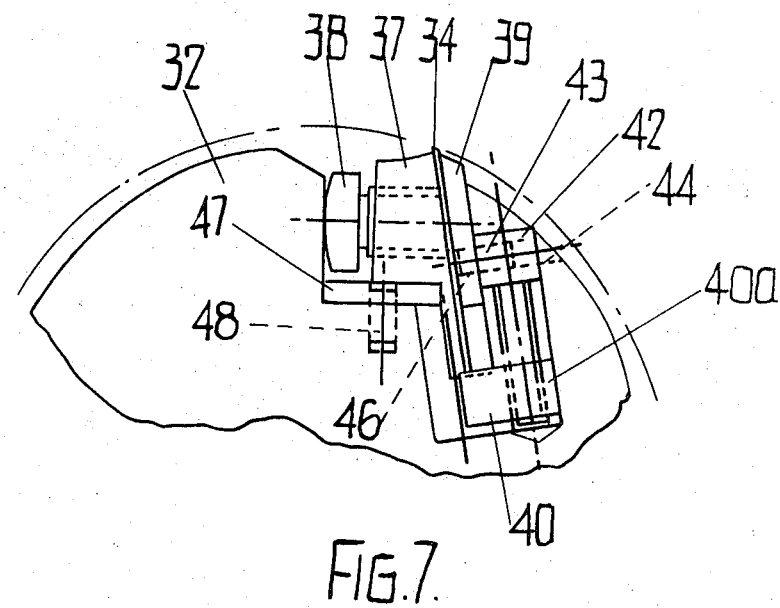
FIG.7.

ROTARY CUTTER FOR WOODWORKING AND SIMILAR MACHINES

This invention relates to an improved rotary cutter for woodworking and similar machines and is concerned with the provision of a cutter having single cutter blade or a plurality of cutter blades spaced around it which is relatively simple to maintain in good working condition.

A rotary cutter as commonly used in various kinds of woodworking machines comprises a block having mounted at positions spaced around its periphery cutter blades which are held in slots in the block, for example by means of wedge pieces or filler pieces tightened by expander bolts screwed into wedge pieces or by clamping screws screwed into holes in the cutter block to engage with filler pieces. In some cases the blades are serrated on one face to mate with a serrated face of the cutter block. Conventional cutter blades are relatively thick and have a relief bevel on one face leading towards the cutting edge.

Ideally the relief bevel should extend right up to the cutting edge, but in order to match the cutting depth of both or all cutter blades on a cutter block a procedure known as jointing is practised in which the blades when fixed in position on the cutter block are rotated with the latter whilst a stone or other grinding or surfacing tool is caused to engage the extremities of the blades and reduce them slightly to a common cylindrical form concentric with the rotational axis of the cutter block within close limits. This procedure causes the outer edges of the cutter blades to be formed with narrow cylindrical lands known as heels. The same procedure is applicable to a rotary cutter having only a single cutter blade on a cutter block, to ensure that the cutting edge on the blade is exactly parallel to the rotational axis of the cutter block. From time to time it becomes necessary to renew the cutting edges of the cutter blades by a re-jointing operation in which parts of the cutting edges are removed by the jointing tool and this causes a slightly wider heel to be produced. There is a limit to the width of heel which is acceptable for proper working, for too wide a heel could give rise to undesirable pounding of the work. This limit is normally considered to be approximately 0.030 inches. When re-jointing causes the heel of a cutter blade to exceed such limit the blade must be re-ground to remove the heel so that the cutting edge is again made suitable for satisfactory jointing. The blade may also need to be reset on the cutter block. Almost inevitably different cutter blades on the same cutter block will have heels of different widths thereby increasing the frequency of the need for regrinding of blades and also leading to working conditions that are not ideal.

The invention provides a form of rotary cutter in which the maintenance of a cutter blade or blades in good working condition is simplified by eliminating the need for grinding or regrinding and at the same time provides a rotary cutter having certain other advantageous characteristics.

In accordance with the invention there is provided a rotary cutter having single cutter blade or a plurality of circumferentially spaced cutter blades, the blade or each blade being reinforced by a backing piece and being of relatively thin construction such that the heel formed on it by jointing will provide the cutting edge and will extend across the full thickness of the blade and be within acceptable limits.

In a particular example the cutter blades or each such blade may be made of a thickness which is of the order of 0.020 inches to 0.030 inches (or somewhat less).

With a cutter having a thin cutter blade or blades in accordance with the invention there is no initial sharpening of the cutter blades or blades, and the need for grinding or regrinding of the blade or blades is avoided as the cutting edge of each blade is formed initially and renewed by the jointing procedure after being suitably mounted on the cutter block. The heel width for a given thickness of blade and cutting angle will always be the same throughout the blade length as it is determined by the removal of the material of the blade at its cutting edge over the whole thickness of the blade.

The invention is applicable to a cutter blade or blades formed of any suitable material, such as carbon and alloy steels, sintered carbindes, ceramics etc; the advantae of the invention being obviously increased with a cutter blade or blades of a material which is not easily fashioned as by machining, stoning or similar processing.

In a particularly practical form of construction the blade or each blade is provided with means for adjusting it outwardly in its slot relatively to the backing piece when unclamped to permit jointing to be repeated as required on a cutting circle of the required diameter. The adjusting means may comprise an abutment plate to engage the innermost edge of the blade and screw means to engage and operate the plate. Conveniently the backing piece is of less radial extent than the blade and has screws mounted in the cutter holder behind it and screwed into the abutment plate so as to be adjustable to move the abutment plate outwardly for adjustment of the blade. Such backing piece may be located in place by a stud or pin in the blade holder engaging a slot or aperture in the backing piece.

A rotary cutter in accordance with the invention may have a cutter blade or blades with a straight cutting edge for planing operations or it may have a profiled cutter blade or blades (e.g., having a non-straight cutting edge or a cutting edge having straight or non-straight portions offset stepwise) for producing moulded shapes on workpieces. In the latter cases the avoidance of the need for difficult or complicated grinding and regrinding operations on the cutter blade or blades ( and similar grinding operations on auxiliary parts such as backing pieces) is a very considerable advantage secured by the invention.

The invention when applied to profile cutters provides profiled cutter blades which are sufficiently thin to require no grinding of a relief bevel along the profile shape of the cutting edge and such blades can be maintained in good working condition merely by the use of profiling jointing equipment. This will form a correctly profiled cutting edge on a single cutting blade and matched profiled cutting edges on both or all of a plurality of cutting blades mounted on the same cutter block by engagement with such blades during rotation of the cutter block. A complicated grinding procedure is thereby completely eliminated.

A similar arrangement of a thin cutter blade or blades can be used with cutter blocks having a low spiral (or shear) such as the adze iron of conventional tenon blocks or with cutter blocks or surfaces planing or thicknessing machines. It is particularly advantageous to employ the present improvement with cutter blocks with relative high shear inbuilt taper (tenon blocks) or built up blocks requiring a matching periphery as such blocks require careful setting of individual cutter blades or even grinding of the cutter blades in the cutter block by special processes.

The use of relatively thin cutter blades of a flexible character and the possibility of being able to joint high shear angle cutters into a true cutting path without the need for sharpness grinding before or after mounting of the cutter blade or blades in the block arising from the improvements according to the invention makes them especially suitable for application to high spiral cutter blocks. Such improved cutter blocks are thereby made practical for use even on surface planers as well as thicknesses, this being a major step forward in the drive to reduce noise set up during the working of such machines.

The accompanying drawings illustrate by contrast with a typical orthodox construction certain convenient ways of practising the invention. These will now be described by way of example with reference to the drawings in which.

Figure 2:
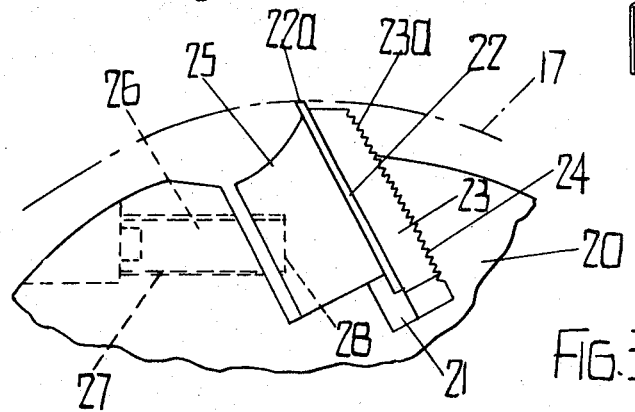
FIG. 2 is a view corresponding to FIG. 1 but showing the application of the invention in one form.
Figure 4:
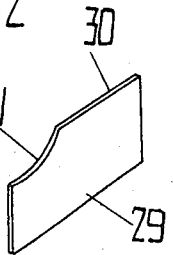
Figure 3:
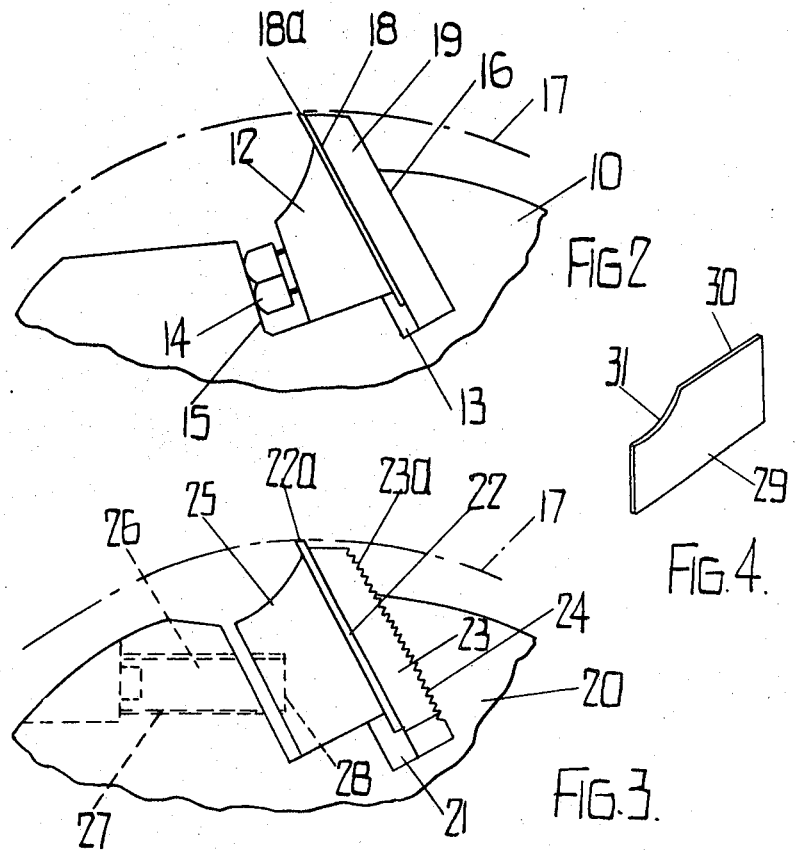
Figure 5:
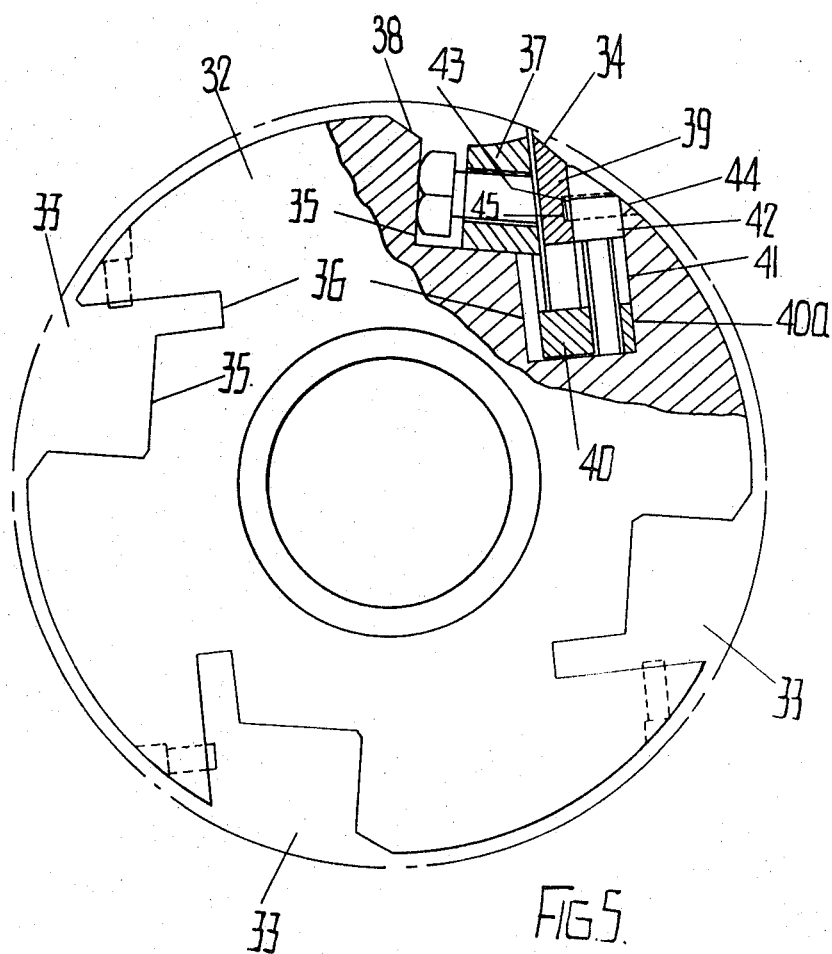
Figure 8:
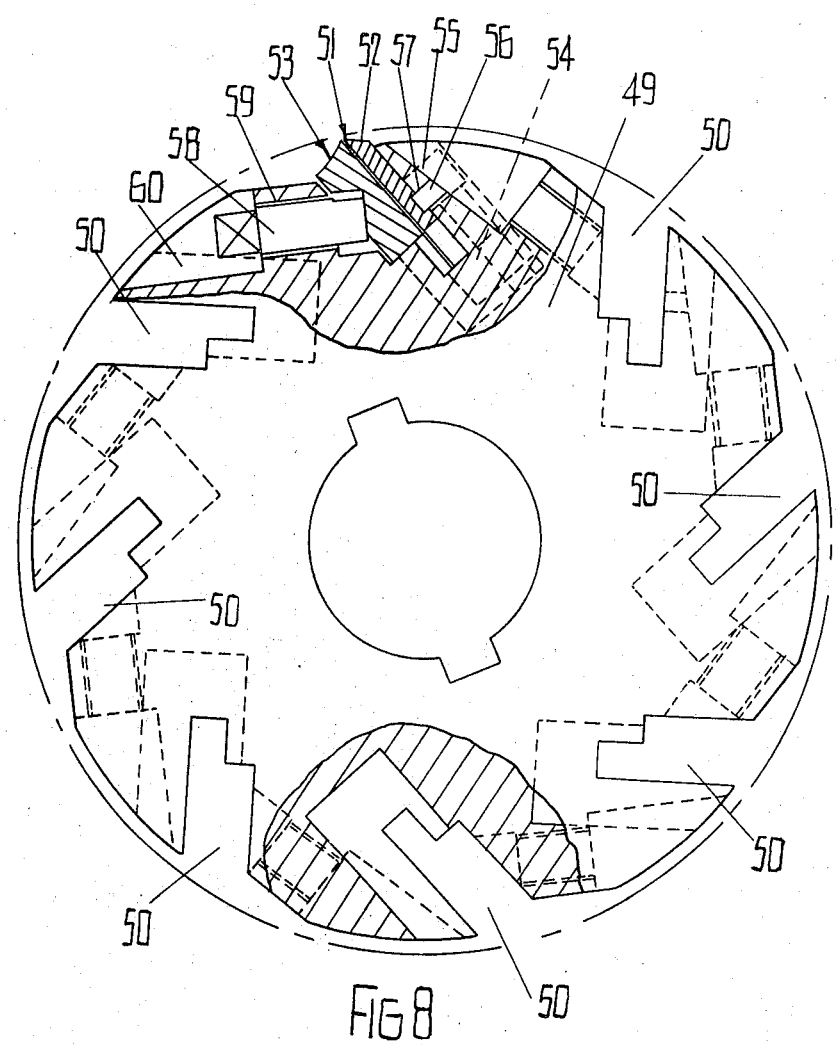

FIG. 3 corresponds to FIG. 2 but shows a modified form of construction;

FIG. 4 is a perspective view of a profile cutter blade as provided in accordance with the invention;

FIG. 5 is an end view partly in cross-section of a more developed form of cutter similar to that of FIG. 2; FIG. 6 is a perspective view of the cutter of FIG. 5;

FIG. 7 shows a further modified construction in end view similar to FIG. 5;

FIG. 8 shows in end view yet another modification and

FIG. 9 is a perspective view of the cutter construction of FIG. 8.

Figure 1:
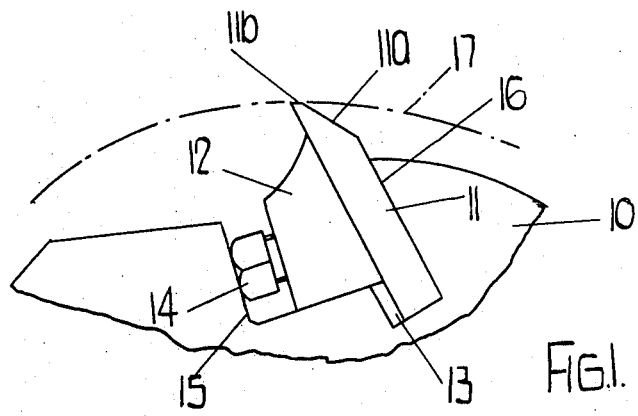
FIG. 1 is an end view of a portion of a rotary cutter block showing the mounting of the blade in a typical orthodox construction.

In FIG. 1 the cutter block is indicated at 10 and a cutter blade at 11. The blade 11 has a relief bevel 11a and is mounted in a slot 13 in the block 10 by means of a wedge piece 12 having screwed into it two spaced expansion bolts 14 (one only appearing in the end view) engaging with a face 15 in a recessed part of the block. Ordinarily blades 11 are mounted at spaced intervals on the block but a single blade 11 only could be provided as shown and the block suitably counterbalanced. A normal jointing operation is performed by stoning or grinding the tip or tips of the cutter blade or blades 11 while in place on the block 10 and during rotation of the block to form part-cylindrical heels as indicated at 11b all the heels of a plurality of blades being on the same cutting circle. When a blade 11 becomes blunt it will in time require to have the relief beval 11a ground somewhat deeper into the blade in order that the heel 11b shall not exceed an acceptable width.

In the construction according to the invention shown in FIG. 2 the blade 11 is replaced by a substantially thinner blade 18 and a backing piece 19. The blade 18 is of such a small thickness that when jointed to form a heel 18a on it to extend through the whole thickness of the blade, such heel will not exceed an acceptable width. Thus fresh heels can be formed on the blade 18 as often as necessary without requiring any grinding or regrinding of the blade since there is no relief bevel on the blade, the blade being adjusted outwardly as required for jointing on the appropriate cutting circle.

A modified arrangement shown in FIG. 3 has a cutter block 20 formed with a blade-receiving recess 21 in which is mounted a thin blade 22 corresponding to the blade 18 on which there is formed by jointing a heel 22a. A blade 22 is held against a backing piece 23 and the backing piece 23 is serrated at 23a to mate with serrations 24 formed on the cutter block 20 at the back of the slot 21. The blade 22 is clamped in place by a wedge piece 25 which is urged against the blade 22 by means of clamping bolts 26 screwed in screw-threaded holes 27 in the cutter block 20.

FIG. 4 illustrates a thin profiled blade 29 to be used on a profiling or moulding cutter block. The cutting edge of the blade 29 has a straight part 30 and a curved recess part 31 in the example shown. Such a cutter blade when mounted on a cutter block carrying other similar cutter blades can be sharpened by the jointing procedure with suitable profile jointing equipment which procedure will cause a heel to be formed of acceptable thickness on the edge parts 30 and 31. The cutting edges can be renewed repeatedly by the jointing procedure which at the same time matches them, without requiring any grinding as would be needed if the blade had a relief bevel such as 11a.

FIGS. 5 and 6 show a cutter block 32 having slots 33 for five circumferentially spaced thin blades 34, only one slot 33 having the blade assembly shown. Each slot 33 has a shallower wide part 35 and a deeper narrow part 36. In the part 35 is housed a wedge piece 37 equipped with two spaced expansion bolts 38, and the part 36 contains the cutter blade 34, a shallow backing piece 39 and an abutment plate or block 40 for outward adjustment of the blade 34. Behind the backing piece 39 spaced holes 41 are formed parallel to and opening on to the slot part 36 in which are freely slidable cheese headed screws 42 screwed through lugs 40a projecting from the abutment plate 40. By turning the screws to cause them to bear against the bottoms of the holes 41 the abutment plate 40, which extends across the inwardly directed edge of the blade 34, is caused to move outwardly so as to adjust the blade to increase its projection from the slot 33. Such adjustment is made whilst the bolts 38 are released and can be made within fine limits. The backing piece 39 is located in place by pins 43 fixed in spaced holes 44 in the cutter block 32 and engaging in a slot 45 in the backing piece 39. In FIG. 5 the heel of the cutter blade 34 is indicated at 34a.

The construction shown in FIG. 7 is only slightly different from that of FIGS. 5 and 6. In FIG. 7 the locating pins 43 engage in through holes 46 in the backing piece 39 and in addition a packing piece 47 secured by a pin 48 forms a slide or the wedge piece 37.

The construction of FIGS. 8 and 9 have a cutter block 49 formed with slots 50 to accommodate eight cutter blades 51. Each slot also contains a backing piece 52, wedge piece 53, abutment plate 54 and adjusting screws 55 like those shown at 39, 37, 40 and 42 in FIG. 5, and is provided with locating pins 56 corresponding to the pins 43 and fitted in holes 57. The wedge pieces 53 are acted on by screws 58 screwed into screw threaded holes 59 leading from recesses 60 in the cutter block 49.

The improvements provided by the invention offer the advantages of a) eliminating knife grinding, b) providing improved jointing by ensuring constant width of heel independently of the number of joints and with the same width of heel on all cutter blades, c) greatly simplified profiling methods, d) the possibility of simple grinding and setting of sheet and spiral cutter blocks, e) the use of jointing to bring built up cutter blocks into a true common periphery, f) reduction in the cost of cutter blades, and g) the possibility of accommodating more cutter blades in a cutter block.

The invention may be applied to cutter blocks in which the cutting angle of the cutter blades can be varied for example by the use of differently shaped inserts in place of the backing pieces 19 or 23 or 39 and wedge pieces or filler pieces 12 or 25 or 37 designed to set the cutter blades at different angles.

It will be evident that instead of providing a separate backing piece such as 19 or 23 or 39, the cutter block 10 or 20 or 32 may itself be so formed that part of it provides the backing piece for the cutter blade 18 or 22 or 34.

What I claim is

1. A rotary cutter for use in woodworking machines comprising a rotary block formed with at least one cutter receiving slot, a thin cutter blade having a thickness not exceeding 0.030 inch, a wedge piece, a backing piece, and clamping means clamping the blade in the slot between the wedge piece and the backing piece, the cutting end of said cutter blade having a part-cylindrical land extending across the full thickness of the blade and being concentric with the rotational axis of the rotary block said cutter blade having been sharpened by jointing to form said land.

2. A cutter as claimed in claim 1 wherein the cutter block has a plurality of circumferentially spaced cutter receiving slots, and wherein a cutter blade, wedge piece, backing piece and clamping means as specified in claim 1 are provided for each slot.

3. A cutter as claimed in claim 1 having the blade formed of material not easily fashioned by machining, stoning or similar processing.

4. A cutter as claimed in claim 1 having means for adjusting the blade outwardly relatively to the backing piece when the blade is unclamped.

5. A cutter as claimed in claim 1 wherein the adjusting means comprises an abutment plate to engage the innermost edge of the blade and screw means to engage and operate the plate.

6. A cutter as claimed in claim 3 having a stud in the cutter block to engage with the backing piece and retain it against outward and inward movement.

7. A cutter as claimed in claim 1 having the cutter blade formed with a cutting edge or edges of stepped or profiled form for producing moulded shapes on workpieces.

* * * * *